(12) United States Patent
Yang et al.

(10) Patent No.: US 9,639,744 B2
(45) Date of Patent: *May 2, 2017

(54) METHOD FOR CONTROLLING AND REQUESTING INFORMATION FROM DISPLAYING MULTIMEDIA

(75) Inventors: Ruiduo Yang, San Diego, CA (US); Ying Luo, Stevenson Ranch, CA (US); Tao Zhang, Plainsboro, NJ (US)

(73) Assignee: THOMSON LICENSING, Issy-les-Moulineaux (FR)

( * ) Notice: Subject to any disclaimer, the term of this patent is extended or adjusted under 35 U.S.C. 154(b) by 914 days.

This patent is subject to a terminal disclaimer.

(21) Appl. No.: 13/138,269

(22) PCT Filed: Jan. 30, 2009

(86) PCT No.: PCT/US2009/000601
§ 371 (c)(1),
(2), (4) Date: Oct. 4, 2011

(87) PCT Pub. No.: WO2010/087796
PCT Pub. Date: Aug. 5, 2010

(65) Prior Publication Data
US 2012/0019684 A1  Jan. 26, 2012

(51) Int. Cl.
*G06K 9/00* (2006.01)
*G06F 3/01* (2006.01)
*H04N 5/228* (2006.01)

(52) U.S. Cl.
CPC ......... *G06K 9/00335* (2013.01); *G06F 3/017* (2013.01); *G06K 9/00228* (2013.01)

(58) Field of Classification Search
CPC ............... H04N 5/232; H04N 5/23293; H04N 5/23219; H04N 2101/00; H04N 9/045;
(Continued)

(56) References Cited

U.S. PATENT DOCUMENTS 5,502,803 A * 3/1996 Yoshida ................. G06F 17/24
345/179
6,377,995 B2  4/2002 Agraharam et al.
(Continued)

FOREIGN PATENT DOCUMENTS

CN  101073048 A  11/2007
EP  1645944  4/2006
(Continued)

OTHER PUBLICATIONS

Devireddy et al., "Real-Time Face Recognition Using SIMD and VLIW Architecture", Journal of Computing and Information Technology—CIT 15, 2007, 2, India, pp. 143-149.
(Continued)

*Primary Examiner* — Sath V Perungavoor
*Assistant Examiner* — Howard D Brown, Jr.
(74) *Attorney, Agent, or Firm* — Brian J. Dorini; Patricia A. Verlangieri

(57) ABSTRACT

The invention provides a robust method to control interactive media using gestures. A method to retrieve metadata information from a multimedia outlet device, wherein the method follows the steps: (1) extracting image hot spot areas in a current captured image using face detection, (2) detecting a human gesture directive in at least one image hot spot area using gesture recognition, (3) determining if the gesture directive matches a pre-assigned command to a rich interaction module, (4) sending a signal to a rich interaction module corresponding to the pre-assigned command detected, (5) extracting a media image hot spot area from electrical signals sent from the multimedia, (6) matching any detected human gestures in at least one image hot spot area using gesture recognition with a specific pixel on a device screen, and (7) retrieving information from metadata assigned to an area of pixels on the screen.

13 Claims, 9 Drawing Sheets

(58) Field of Classification Search
CPC .................. H04N 5/772; H04N 5/335; G06T 2207/20201; G06T 2207/20021; G06T 7/20; G06K 9/0061; G06K 9/00221; G06K 9/3241; G07C 9/00158; G07C 9/00087; G06F 21/32; G06Q 20/341; G07F 7/1008
USPC ............ 348/152, 169, 222.1, 448; 345/473; 382/167
See application file for complete search history.

(56) References Cited

U.S. PATENT DOCUMENTS

| | | | |
|---|---|---|---|
| 6,501,515 B1 | 12/2002 | Iwamura | |
| 6,904,408 B1 | 6/2005 | McCarthy | |
| 6,919,892 B1* | 7/2005 | Cheiky | G06T 13/40 345/473 |
| 7,032,178 B1 | 4/2006 | McKnight et al. | |
| 7,283,983 B2 | 10/2007 | Dooley et al. | |
| 2004/0190776 A1* | 9/2004 | Higaki | G06K 9/00375 382/190 |
| 2005/0046702 A1* | 3/2005 | Katayama et al. | 348/222.1 |
| 2005/0094019 A1* | 5/2005 | Grosvenor | G03B 17/00 348/335 |
| 2005/0206785 A1* | 9/2005 | Swan et al. | 348/448 |
| 2006/0197839 A1* | 9/2006 | Senior et al. | 348/169 |
| 2006/0245644 A1* | 11/2006 | Whitman | 382/167 |
| 2008/0019589 A1* | 1/2008 | Yoon | G06K 9/00355 382/165 |
| 2008/0126937 A1 | 5/2008 | Pachet | |
| 2009/0219392 A1* | 9/2009 | Roskowski | 348/143 |
| 2009/0278934 A1* | 11/2009 | Ecker et al. | 348/152 |
| 2011/0289455 A1* | 11/2011 | Reville | G06F 3/017 715/830 |

FOREIGN PATENT DOCUMENTS

| | | |
|---|---|---|
| EP | 1744301 | 1/2007 |
| EP | 1939713 | 7/2007 |
| JP | 6-214982 A | 8/1994 |
| JP | 2003186596 | 7/2003 |
| JP | 2006040271 | 2/2006 |
| JP | 2006155244 | 6/2006 |
| JP | 2006268582 | 10/2006 |
| JP | 2008516322 | 5/2008 |
| KR | 100237281 | 1/2000 |
| KR | 100597798 | 7/2006 |
| TW | 20061180 | 1/2006 |
| WO | WO0139476 | 5/2001 |
| WO | WO0232136 | 4/2002 |
| WO | WO2006037786 A2 | 4/2006 |
| WO | WO2006043925 | 4/2006 |

OTHER PUBLICATIONS

Jaimes, "The Face in Activity Analysis and Gesture Interfaces", FXPAL Japan, Japan.
Search Report.
International Business Machines Corporation: "Secondary help available from text of common tooltip", Research Disclosure, Mason Publications, Hampshire, GB, vol. 447, No. 145, Jul. 1, 2001, XP007128646.

* cited by examiner

METHOD FOR CONTROLLING AND REQUESTING INFORMATION FROM DISPLAYING MULTIMEDIA

This application claims the benefit, under 35 U.S.C. §365 of International Application PCT/US09/000601, filed Jan. 30, 2009, which was published in accordance with PCT Article 21(2) on Aug. 5, 2010 in English.

FIELD OF THE INVENTION

The invention relates to a method of controlling media, in particular, the invention relates to a method of using face recognition to retrieve useful information related to recognized characters in displaying multimedia by recognizing gestures requesting such information.

BACKGROUND OF THE INVENTION

Users who operate electronic devices have become increasingly reliant on the electronic remote control. The electronic remote control permits that user to issue commands from a distance, issuing commands to the electronic devices through infrared (IR) and radio signals.

In a typical home, one or more electronic devices, such as a television, cable TV receiver, CD player, video recorder, DVD player, audio receiver, computer systems and even lighting, can be controlled using remote controls. In fact, many electronic components rely on commands through remote controls, where the remote can only access electronic device preferences. Although electronic remote controls have become very complex in nature, their use has become evermore popular, especially since many remotes have created further accessibility to live media. Many electronic consumers have a stronger desire to increase interactivity with all forms of multimedia, especially the television.

Electronic consumers have long desired increased interaction and participation with multimedia. Eliminating an electronic remote would be no exception. Using human body gestures to command electronic devices has been discussed for years in science fiction. However, with advances in gesture recognition, human gestures have proven worthy in issuing commands to electronic outlets.

Gesture recognition technology allows users to interact with electronic devices without the use of other mechanical devices, such as an electronic remote control. This technology usually includes a camera that reads the movements of the human body and communicates the data collected from the camera to a computer. The computer then recognizes a selected gesture as a intended command for the electronic device. For instance, in practice, the user can point a finger at a television or computer screen in order to move a cursor or activate an application command.

An interactive media system is disclosed in U.S. Pat. No. 7,283,983, which teaches a computer coupled to a video camera to provide a method for utilizing imaging and recognition techniques to provide augmented interaction for a human user in conjunction with use of printed media such as books, educational materials, magazines, posters, charts, maps, individual pages, packaging, game cards etc. The computer system uses a vision-based sensor to identify printed media and retrieve information corresponding to that view. The sensor then identifies a first user gesture relative to, at least, a portion of the media. The computer system then interprets the gesture as a command, and based at least in part on the first gesture and the retrieved information, the system electronically speaks aloud at least a portion of the retrieved information.

Human gestures can originate from any bodily motion or state, including the hand movement described above. Facial recognition can further assist a motion detection system by distinguishing where those gestures come from, and filtering out non-relevant movement.

Although humans have the innate ability to recognize and distinguish between faces, it has been quite difficult to employ that same intrinsic capability into computer software. However, in the past few years, the systems have become better developed.

Facial recognition, used with computer systems, permits the identification and verification of a person from a digital image or video source. Since the human face has numerous, distinguishable characteristics, comparison of these characteristics may be utilized for identification of a person. Using algorithms, computer software can compare characteristics, such as the distance between the eyes, depth of eye sockets, shape of cheekbones, as well as many other facial features, and then compare each feature with existing facial data.

U.S. Pat. No. 6,377,995, issued to Agraham et al., provides a method and apparatus for indexing multi-media communication using facial and speech recognition, so that selected portions of the multi-media communications can be efficiently retrieved and replayed. The method and apparatus combine face and voice recognition to identify participants to a multicast, multimedia conference call, which can include data or metadata. A server determines an identity of a particular participant when both the audio and video face patterns match speech and face models for particular participants, and then creates an index of participants based on identification of speech and face patterns of the participants, whereby the index is used to segment the multimedia communication.

Depth-awareness cameras are widely available and used to control media, as well. Video pattern recognition software, such as the Sony Eyetoy and Playstation Eye, utilize specialized cameras to generate a depth map of what is being seen through the camera at a short range, allowing a user to interact with media using motion, color detection and even sound, using a built-in microphone.

U.S. Pat. No. 6,904,408 issued to McCarty et al. teaches a web content manager used to customize a user's web browsing experience. The manager selects appropriate online media according to a user's psychological preferences, as collected in a legacy database and responsive to at least one real-time observable behavioral signal. Skin temperatures, pulse rate, heart rate, respiration rate, EMG, EEG, voice stress and gesture recognition are some of the behavioral responses and psychological indicators are measured and analyzed. Gesture recognition is accomplished by computer analyses of video inputs. The position of the face may indicate an upbeat or downbeat attitude, where the count of blinks per minute may be used for indicating anxiety.

Gesture recognition has proven advantageous for many applications. However, gesture recognition has many challenges, including robustness and accuracy of the gesture recognition software. For image-based gesture recognition there are limitations associated with the equipment and the amount of noise found in the field of view. Unintended gestures and background movement hamper full recognition of issued commands.

There has been a need to control media content, especially using human gestures. However, previous approaches have employed gesture recognition techniques that are not robust.

SUMMARY OF THE INVENTION

The invention provides a robust method to control interactive media using gestures.

A method to retrieve metadata information from a multimedia outlet device, wherein the method follows the steps: (1) extracting image hot spot areas in a current captured image using face detection, (2) detecting a human gesture directive in at least one image hot spot area using gesture recognition, (3) determining if the gesture directive matches a pre-assigned command to a rich interaction module, (4) sending a signal to a rich interaction module corresponding to the pre-assigned command detected, (5) extracting a media image hot spot area from electrical signals sent from the multimedia, (6) matching any detected human gestures in at least one image hot spot area using gesture recognition with a specific pixel on a device screen, and (7) retrieving information from metadata assigned to an area of pixels on the screen.

The invention further relates to a media control apparatus having a media control apparatus having a camera having an image sensor and an input image module that receives picture images through the image sensor. The input image module further connects to a face detection module and a gesture recognition module, through the memory. A media control interface receives commands from the input image module and issues electrical signals to a rich interaction module, which attaches to a multimedia outlet device, and is capable of receiving and sending electrical image signals from the multimedia outlet device.

BRIEF DESCRIPTION OF THE DRAWINGS

The invention will be explained in greater detail in the following with reference to embodiments, referring to the appended drawings, in which.

DETAILED DESCRIPTION OF THE INVENTION

The invention will now be described in greater detail wherein embodiments of the present invention are illustrated in the accompanying drawings.

Figure 1:
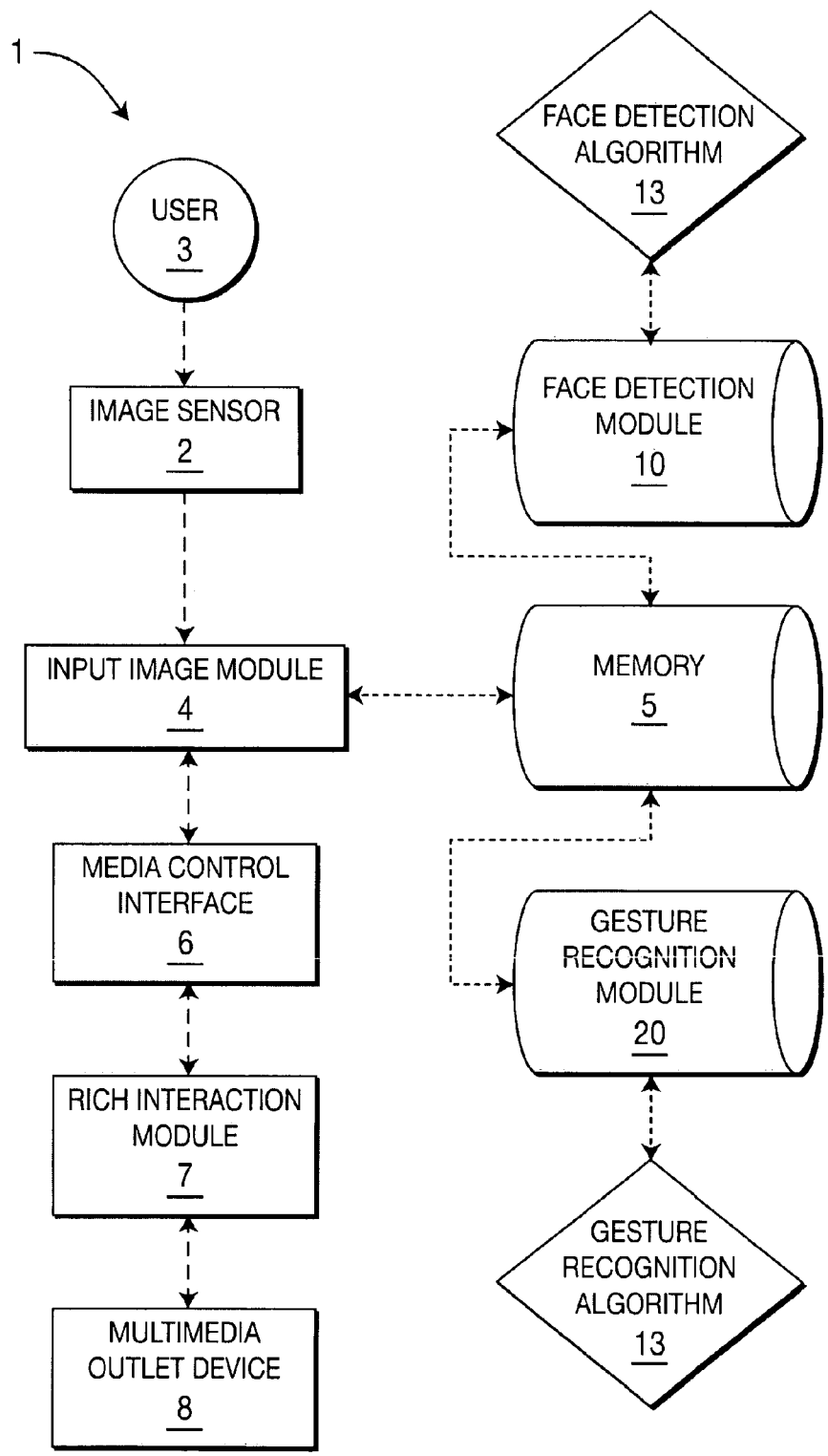
FIG. 1 is a block diagram of a representative equipment used by a multimedia control system.

Referring now to FIG. 1, a multimedia control system 1 according the present invention is illustrated. The multimedia control system comprises an image sensor 2, an input image module 4 connected to a memory 5, a media control interface 6, a face detection module 10 and a gesture recognition module 20 connected to the memory 5, a rich interaction module 7 and a multimedia outlet device 8.

The image sensor 2, in particular, is a device that converts an optical image to an electrical signal. The electrical signal is input to the image module 4 and is stored into the memory 5 prior to processing.

Figure 2:
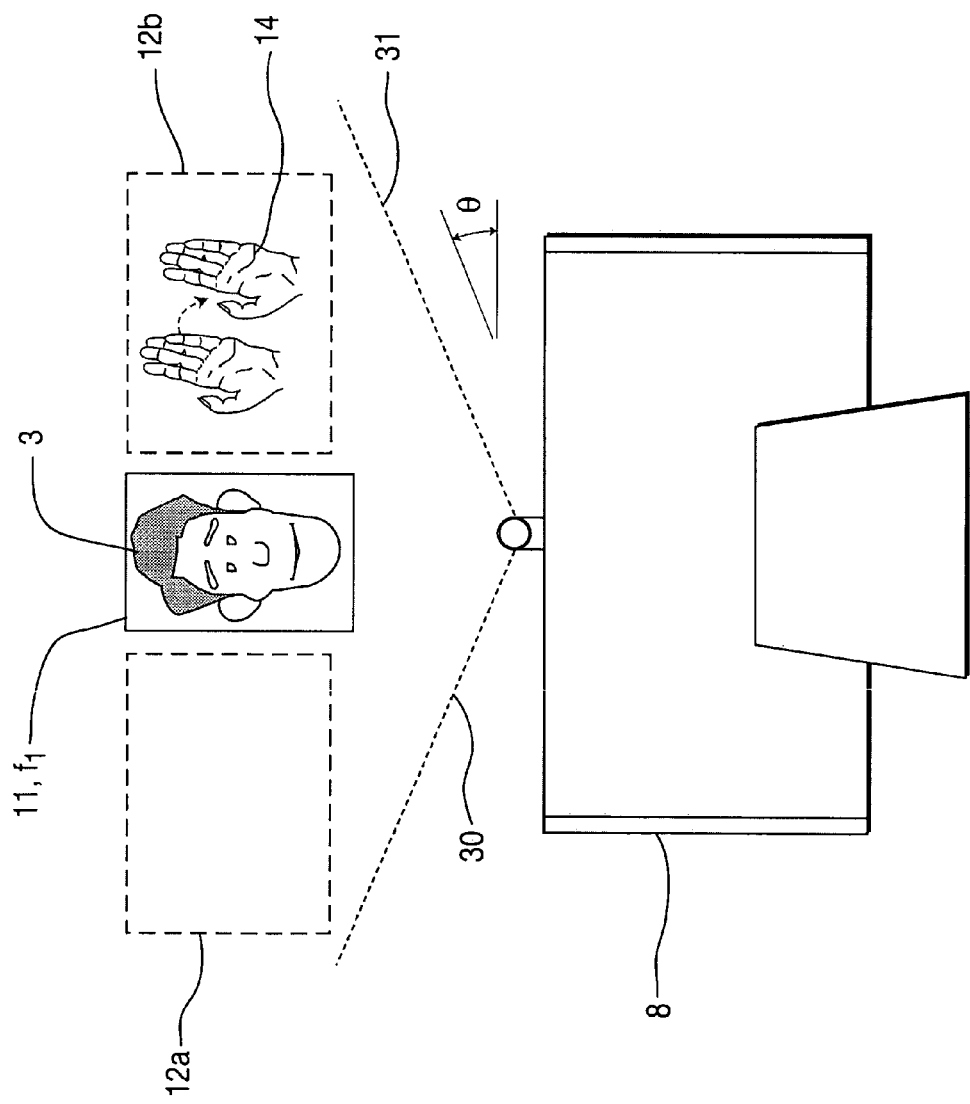
FIG. 2 is a perspective view of the multimedia control system.

Fundamentally, the image sensor 2 is used in conjunction with a digital camera 30, as further illustrated in FIG. 2. The camera 30 is used to capture and focus light on the image sensor 2. The image sensor 2 captures a plurality of still images from a multimedia user 3, who may or may not issue commands to the multimedia outlet device 8. The image sensor 2 accomplishes the task of converting captured light into electrical output signals, which are processed through the input image module 4. The face detection and gesture recognition modules 10, 20 are connected to the input image module 4 through the memory 5, and process the electrical signals, in conjunction determining if an issued command has been performed by the user 3.

The camera 30 may have a zoom lens (not shown), which can adjust the camera's field of view, by an angle θ. This is the first and most fundamental way to limit potential noise. A multimedia user 3 can adjust the camera 30, so that the camera can focus in on the multimedia user 3.

In an embodiment, the input image module 4 is a programmable device, such as microprocessor. Although the input image module 4 can be integrally fabricated into a digital camera 30, a further embodiment may allow a solitary construction of the input image module 4, separate from camera 30 and image sensor 2, and connected by wires.

The input image module 4 has a memory component 5, which stores incoming image frames captured by the camera 30 and signaled by the image sensor 2. The stored images are collected and stored for processing between the face detection module 10 and the gesture recognition module 20. The media control interface 6 is yet another component of the input image module, preferably provided in a unitary construction. However, it is possible that the media control interface 6 be provided as an external component to the input image module 4.

The input image module 4 contains modules 10, 20 whose logical function and connectivity is pre-programmed according to algorithms associated with the face detection and gesture recognition. Both the face detection and gesture recognition modules 10, 20 are integrally constructed with input image module 4 in an embodiment of the invention. Depending on results determined by the face detection and gesture recognition modules 10, algorithms, the input image module 4 will provide commands to a multi-media outlet device 8 through the media control interface 6, as illustrated in FIG. 1.

In an embodiment, commands are pre-programmed by pre-assigned gesture directives. The gesture recognition module 20 recognizes a number of specific gesture directives as specific commands that are to be carried out by the multimedia outlet device 8. For example, if the user waves his right hand to the right of his face, the gesture recognition module will recognize that gesture as a command to turn the multimedia outlet device 8 off. However, the system 1 would be capable, in other embodiments, to allow a user 3 to program their own specific gestures as issued commands. For instance, the user could program the system 1 so that the off command is triggered by the user waving his left hand to the left of his face as the off command.

The rich interaction module 7 pulls signals from the multimedia outlet device 8 in order to send those signals to the input image module 4 for processing of images displayed on the multimedia outlet device 8. Further, the rich interaction module 7 matches user 3 pointing with specific spots on the device screen 9.

The multimedia control system 1, according to the present invention and illustrated in FIG. 1, provides a user 3 the method of controlling media, in particular, a method of using face recognition to index useful information related to a character in multimedia and then recognizing gestures requesting information on a corresponding character. The purpose of the invention is to allow a user 3 to retrieve metadata concerning figures on a multimedia outlet device 8 in a robust way, solely using human gestures. The gestures are captured through a camera 30 and image sensor 2. However, the gesture will only be recognized if the gesture is performed in an assigned image hot spot area, which is defined and extracted by algorithms performed by the face detection module 10. The gesture recognition module 20 performs algorithms in order to robustly determine if the movement performed by a user is an actual issued command. If the gesture recognition module 20 determines that the movement is an intended command, it will further determine which command it is, based on a dictionary of gestures pre-assigned in the memory 5.

As further illustrated in FIG. 2, the user 3 may command the multimedia outlet device 8 using human gesture directives 14, such as on/off, start/stop, rewind/fast-forward, etc/, without the use of an electronic remote device. The multimedia outlet device 8 may a variety of electronic devices, such as a television or CPU monitor. However, in the embodiment, the multi-media outlet device 8 is a television set.

As illustrated in FIG. 2, the camera 30 captures images in a field of view 31. A current captured image $C_i$ is electronically signaled, using the image sensor 2, to the input image module 4 in order to be processed by the face detection module 10. The face detection module 10 determines faces in the field of view 31, assigning face areas 11, starting with $f_1$. Based on this face area 11, assigned as $f_1$, the face detection module further extracts and assigns image hot spot areas 12a, 12b to refine recognition of gesture directives 14. It is also possible to have the face detection module extract and assign only one hotspot area 12a. In such a situation, a single hotspot area 12a is used to filter out unwanted motions with even more improved robustness.

In the embodiment shown, each image hot spot area 12a, 12b is defined by a face area $f_1$, where a first image hot spot area 12a is assigned to an area just left of the face area $f_1$, and a second image hot spot area 12b to an area just right of the face area $f_1$. In the embodiment shown, the dimensions of either image hot spot area 12a, 12b will depend on the size of the face area $f_1$. The face area $f_1$ is defined by an area substantially above the top of the head, and an area substantially below a detected face. In the embodiment shown, the sizes of face area $f_1$ and image hot spot areas 12a, 12b can be calibrated to a smaller or larger dimension to better refine the recognition of human gesture directives 14.

The position of an assigned hot spot area 12a, 112b may be flexible, as long as they are close to the detected face area $f_1$, and the captured image $C_i$ in the hot spot area 12a, 12b can be easily identified. For example, an assigned hot spot area 12a, 12b area just below the head is not a good candidate, since the body image will interfere with the hand image in that area.

Figure 3:
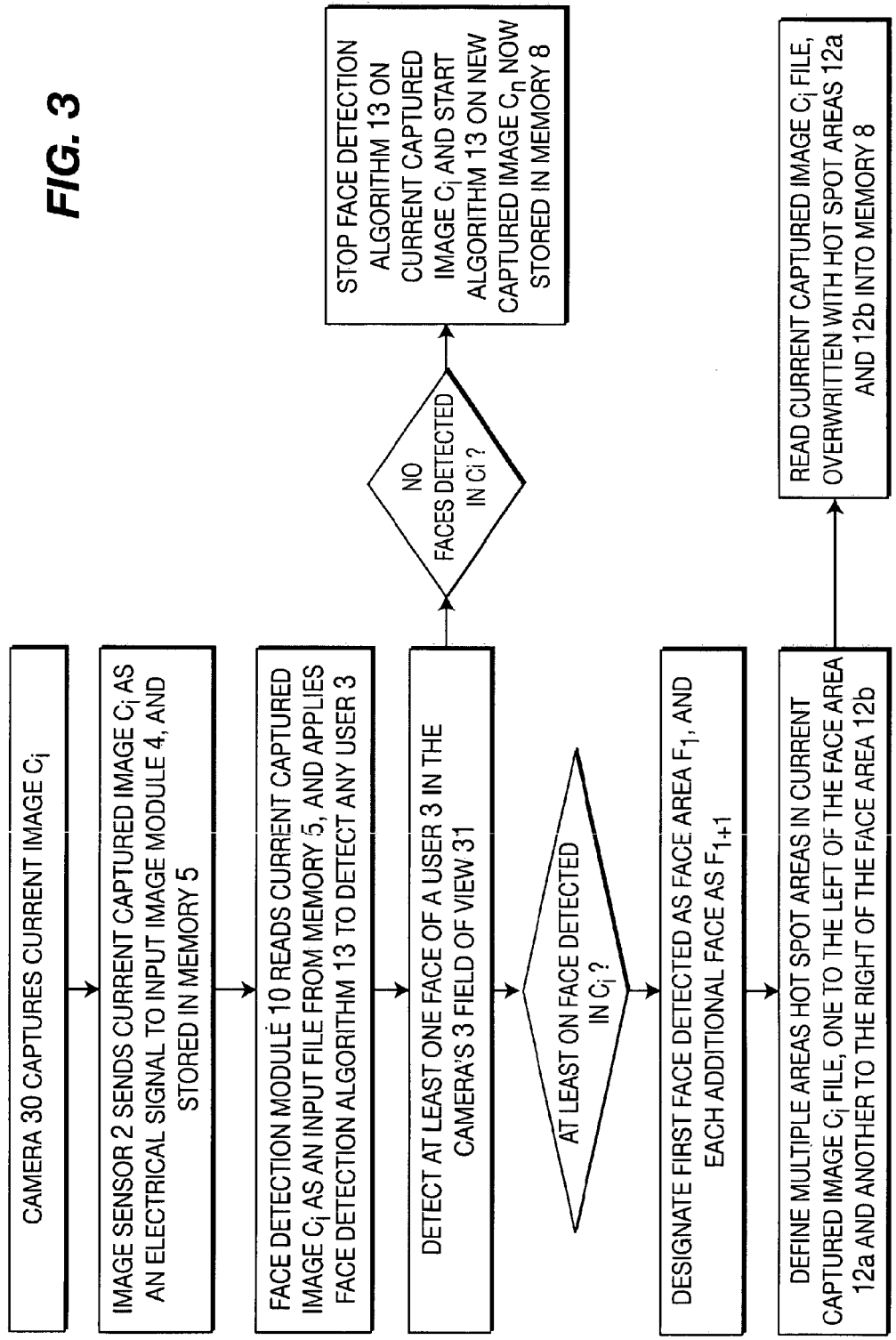
FIG. 3 is flow diagram of the face detection module, applied to an image captured by a camera.
Figure 4:
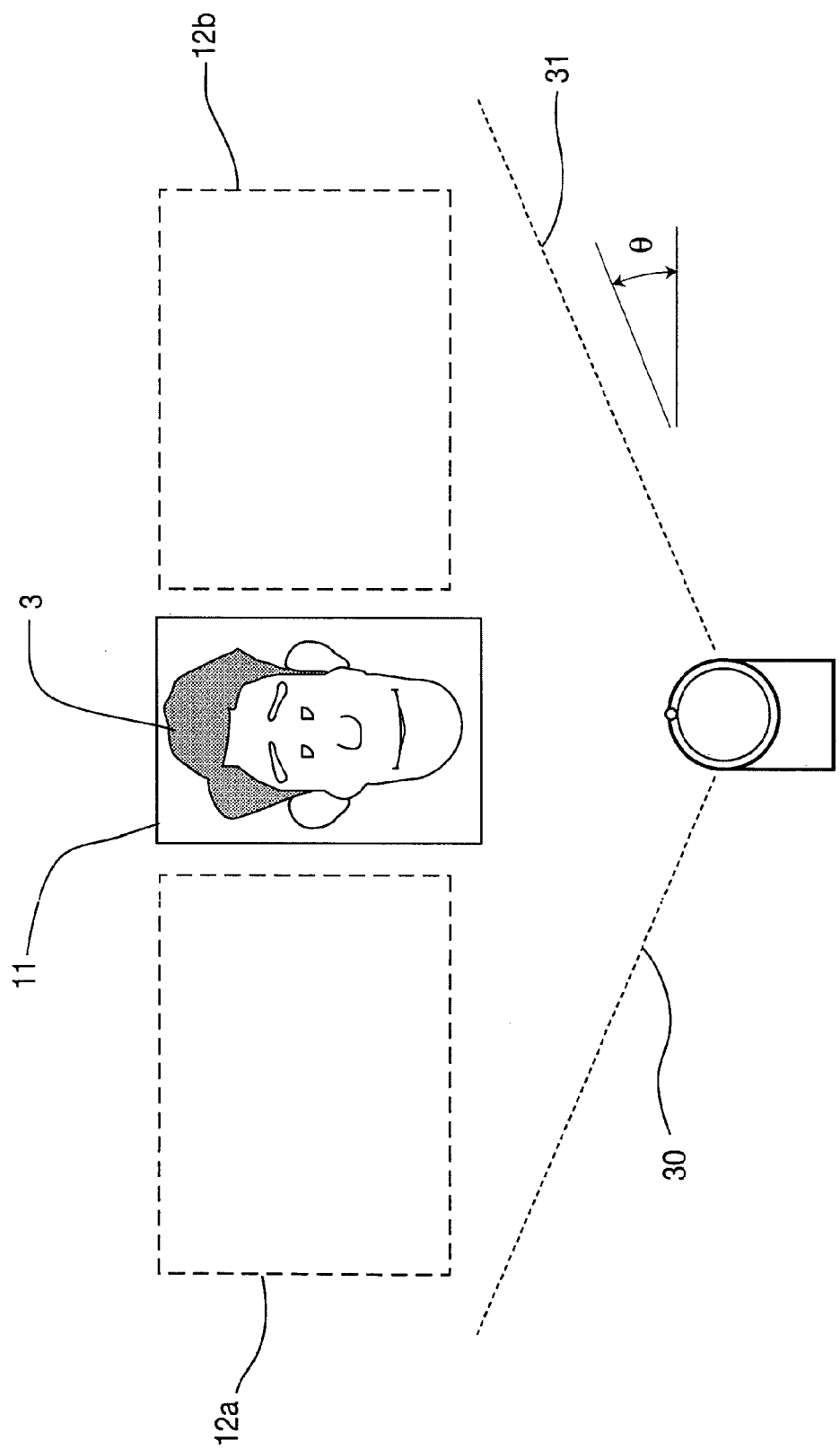
FIG. 4 is illustrative representation of the face detection module processing a current captured image using the face detection algorithm.

FIG. 3 is a flow diagram of an image hot spot extraction method using face detection, while FIG. 4 illustrates a visual representation of the face detection method. First, the camera 30 captures a current captured image $C_i$, which is converted to an electrical signal by the image sensor 2. The signal is stored as a file in the memory 5 so that it can be first processed by the face detection module 10.

The face detection module 10 runs a face detection algorithm 13 using the current image $C_i$. The face detection algorithm 13 processes the current captured image file $C_i$, detecting any faces in the field of view 31. The face detection algorithm 13 is capable of detecting a number of faces, as stated above, and assigning face area's ($f_1, f_2, \ldots f_n$).

Initially, the face detection algorithm 13 takes the current image $C_i$ from the memory 5, as an input file. The first face recognized will be designated as a face area $f_1$. Depending on the number of faces within the field of view 31, the algorithm will identify other face areas, designating the second face area as $f_2 \ldots f_n$, where n represents the number of faces in the field of view 31. If the algorithm detects no faces, the face detection module 10 will return to the memory 5 and repeat the face detection algorithm 13 operation with a new captured image Cn.

After a face is identified, the face detection module 10 will identify and designate the face's left area and right area as image hot spot areas 12a, 12b, respectively. The image hot spot areas 12a, 12b are utilized as masks, to filter out unintentional gesture directives in non-hotspot areas. Once the image hot spot areas 12a, 12b are assigned, the module will produce an output file. The output file consists of an array of rectangles, which corresponds to face area $f_1$ and the image hot spot areas 12a, 12b, being scaled by the dimension of the face area $f_1$ detected. The output file is now stored back in the memory 5, so that it can be further processed by the gesture recognition module 20.

Figure 5:
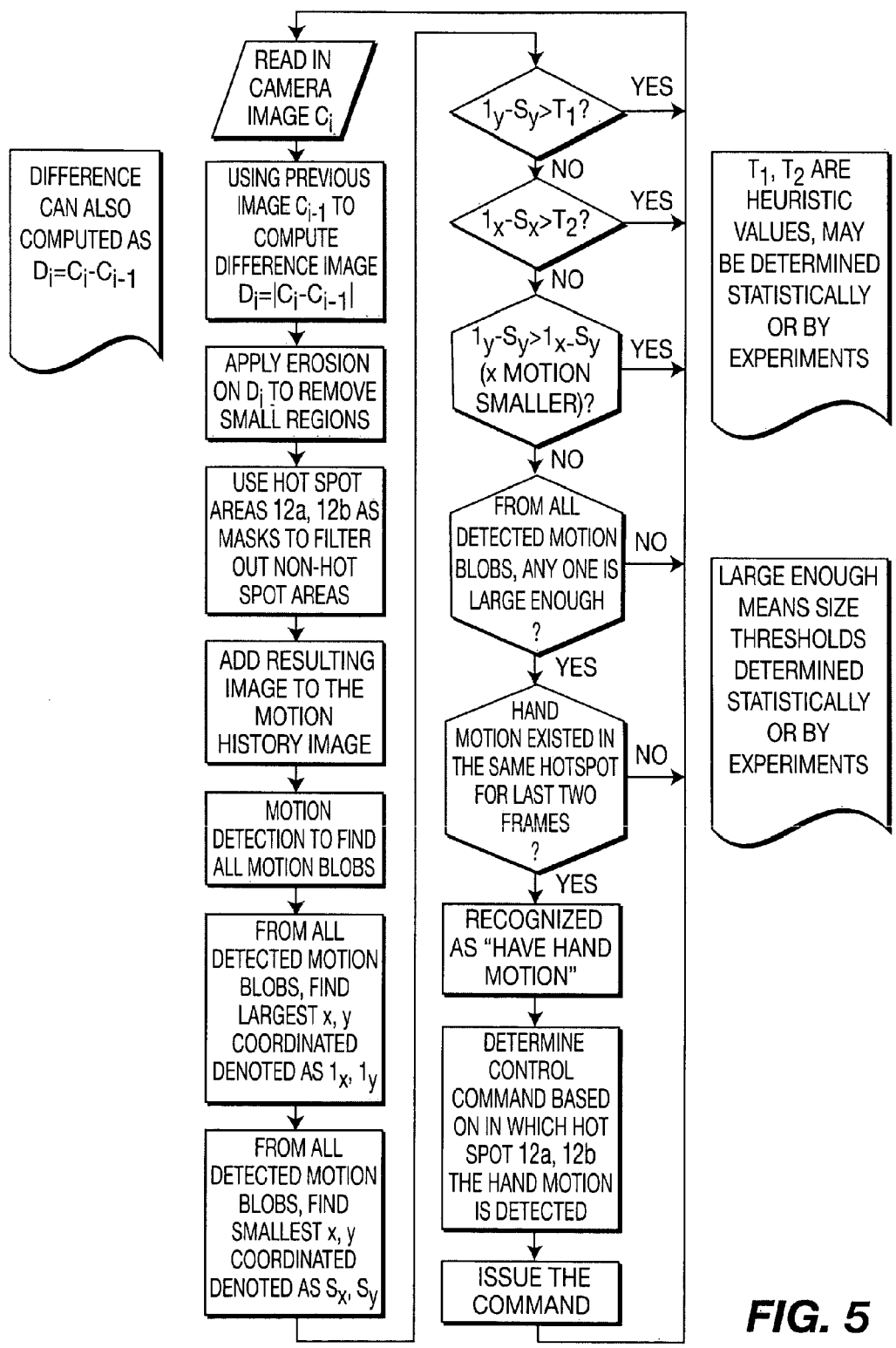
FIG. 5 is flow diagram of the gesture recognition module.
Figure 6:
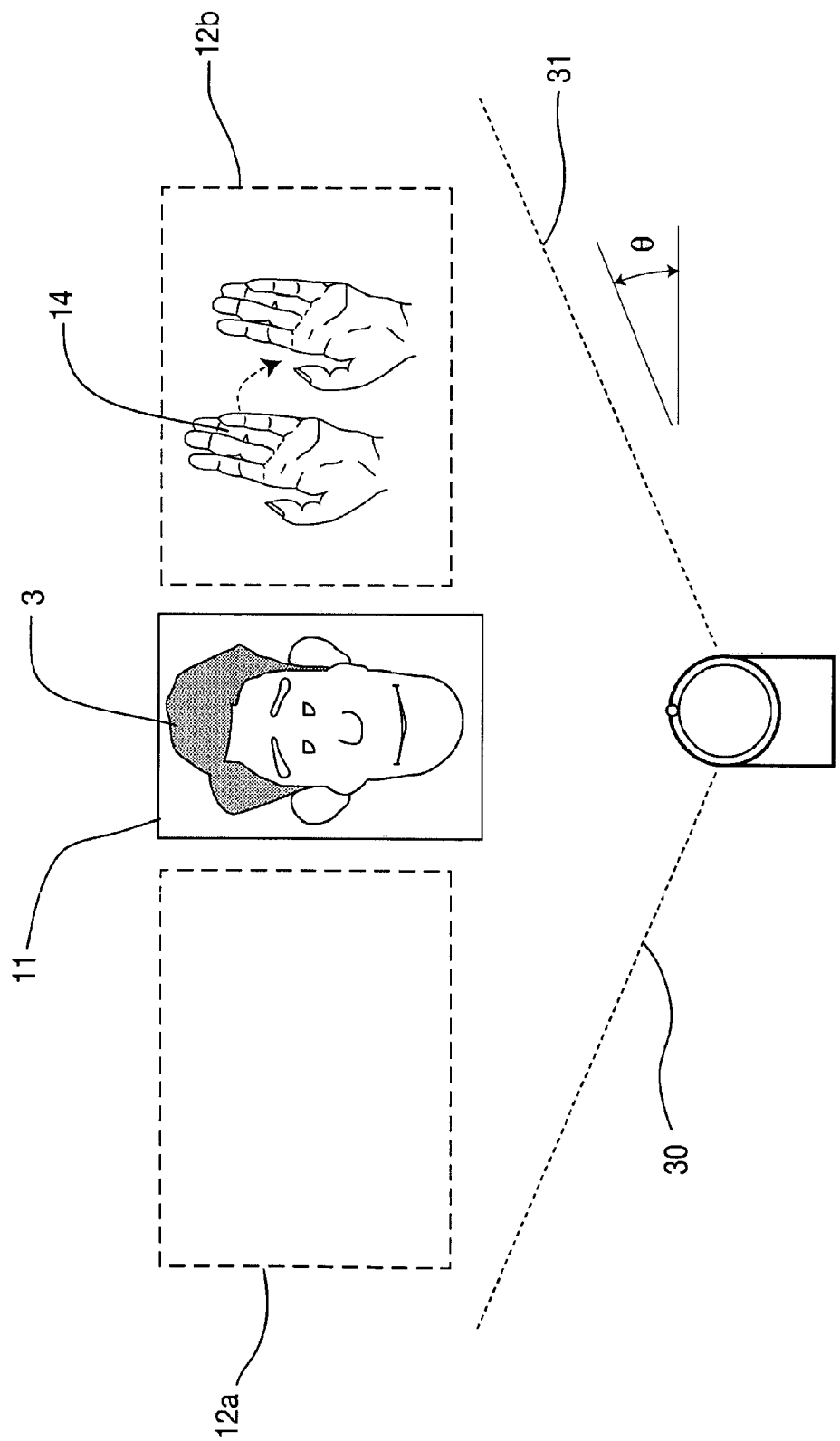
FIG. 6 is illustrative representation of the gesture recognition module processing a current captured image using the gesture recognition algorithm.

FIG. 5 is a flow diagram representing media directive for controlling media using gesture recognition, while FIG. 6 illustrates a visual representation of the gesture recognition and media controlled directive.

After the current captured image $C_i$ file is read back into memory 5 from the face detection module 10, the gesture recognition module 20 then runs a gesture recognition algorithm 21.

Using a previous captured image file $C_{i-1}$, also stored in memory 5, the gesture recognition algorithm 21 first calculates the absolute value of a difference $D_i$ between the current captured image $C_i$ and the previous captured image $C_{i-1}$. The gesture recognition algorithm 21 also applies an erosion operation to the difference $D_i$ to first remove small areas, assisting a more refined recognition of a human gesture directive 14.

In the embodiment shown, a function cvErode is used to perform erosion on the difference $D_i$. The cvErode function uses a specified structuring element that determines the shape of a pixel neighborhood over which the minimum is taken. Although the erosion function is only applied once in the embodiment shown, the erosion function can be applied several times to the difference $D_i$ in other embodiments.

Since the captured images $C_i$ and $C_{i-1}$ were previously processed by the face detection module 10, and stored in the memory 5, each captured image $C_i$ and $C_{i-1}$ contains assigned, extracted image hot spot areas 12a, 12b. The gesture recognition algorithm 21 uses the extracted image hot spot areas 12a, 12b to mask and filter movement in non-hot spot regions. As a result, the gesture recognition algorithm 21 modifies the difference $D_i$ with respect to motion in the non-designated image hot spot areas, building a motion history image (MHI). The motion history image (MHI) is used to detect motion blobs, and further operations of the gesture recognition algorithm 21 determine if these gesture blobs are actual human gesture directives 14

The motion history image (MHI) quantifies and qualifies movement over time, representing how the motion took place during image sequence. In the present invention, motion blobs are reviewed and recognized by the gesture recognition module 20 in specific areas, particularly the image hot spot areas 12a, 12b.

Each motion history image (MHI) has pixels, identified and defined by specific image coordinates x, y of timestamp. The image coordinates x, y relate to a latest motion in that pixel. As movement is detected in the image hot spot areas 12a, 12b, the gesture recognition algorithm 21 revises the motion history image (MHI) to create a layered history of the resulting motion blobs.

For all of the motion blobs detected in the image hot spot areas 12a, 12b, the gesture recognition algorithm 21 locates the largest and smallest x,y pixel coordinates, and denotes the largest value as $l_x$, $l_y$, and the smallest value as $S_x$, $S_y$.

Using the largest and smallest x,y pixel coordinates, of the motion history image (MHI), the gesture recognition algorithm 21 will first determine if the difference between $l_y$ and $S_y$ is larger than a first heuristic value $T_1$ ($l_y-S_y>T_1$). If that question is answered yes, then the gesture recognition algorithm 21 will not recognize the current captured image $C_i$ as having a recognized gesture directive 14. The first heuristic value $T_1$ may be determined statistically or by experiments, and implemented into the algorithm before the multimedia control system 1 is installed. If there are no recognized gesture directives 14, then the gesture recognition algorithm 21 will stop processing $C_i$, and starts over with a new captured image $C_n$, which has been first processed by the face detection module 10.

If the difference between $l_y$ and $S_y$ is not larger than the first heuristic value $T_1$, then the gesture recognition algorithm 21 will move to the next step, and determine if the difference between $l_x$ and $S_x$ is larger than a second heuristic value $T_2$ ($l_x-S_x>T_2$). If so, then the gesture recognition algorithm 21 will not recognize the current captured image $C_i$ as having a recognized human gesture directive 14, starting over with a new captured image $C_n$. Otherwise, the gesture recognition algorithm 21 will determine if the x motion ($l_x-S_y$) is smaller than the y motion ($l_y-S_y$). If the x motion is smaller than y motion, then the gesture recognition algorithm 21 will not recognize a gesture directive 14 in the current captured image $C_i$, again the algorithm 21 will start over with a new captured image $C_n$.

As a default, if the gesture recognition algorithm 21 has yet to identify and recognize a gesture directive 14 in the current captured image Ci, but there is some "big enough" components in the motion history image (MHO, then the gesture recognition algorithm 21 will determine there is a "have hand motion." "Big enough" would be a heuristic threshold determined statistically or through experiments, prior to implementation of the system 1.

If there are three continuous captured images having recognized "have hand motions", then the gesture recognition module 10 will issue a specific command to the multimedia outlet device, through the media control interface 6.

The "have hand motion" should be a gesture directive 14 that controls a specific command to the multimedia outlet device 8. The specific control command that relates to the "have hand motion" is determined on where the "have hand motion" is recognized, either the left image hot spot area 12a or the right image hot spot area 12b. As discussed above, the specific control command is either pre-assigned to a specific image hot spot area 12a, 12b, or can be programmed by the user 3.

The gesture recognition module 20 sends a specific command if the "have hand motion" is recognized over three continuous captured images. That specific command is then sent to media control interface 6 that relays a corresponding electrical command signal to the multimedia outlet device 8.

All gesture directives for deferent gestures will be well-defined, pre-assigned commands stored in the multimedia control system 1. However, it is possible that the user 3 can define his own commands prior to use. Therefore, if a hand wave in the right image hot spot area 12b is a defined gesture to turn-on the multimedia outlet device 8, and the gesture recognition algorithm 21 recognizes the hand wave as a gesture directive 14 in the right image hot spot area 12b, then the multimedia outlet device 8 will be signaled to turn-on. Conversely, if a hand wave in the left image hot spot area 12a is a defined gesture to turn-off the multimedia outlet device 8, and the gesture recognition algorithm 21 recognizes the hand wave in the left image hot spot area 12a as a gesture directive 14, then the multimedia outlet device 8 will be signaled to turn-off.

There are two implementations when the motion history image (MHI) is built, in order to perform motion detection. In one implementation, the motion history image (MHI) is built using the whole captured image C. However, in the another implementation, the motion history image (MHI) is built using only the hot spot area 12a, 12b image. Either implementation will lead to same results when the user 3 is stationary, i.e. little or no head motion. However, if the user 3 is moving, these implementations are different.

In the embodiment shown, the assigned hot spot areas 12a, 12b are relative to the face $f_1$, and the face $f_1$ may be moving somewhat. Although the motion detection may be accurate in these cases, it is possible that the movement by the head will cause errors in motion detection. If the motion history image (MHI) is built using whole image, there maybe be motion in an assigned hot spot area 12a, 12b. However, if the motion history image (MHI) is built only using assigned hot spot area 12a, 12b, then it is possible to refine detection because external motion is filtered out.

Additionally, in an embodiment, where only one hot spot area 12a is assigned, a more powerful gesture recognition algorithm is needed to recognize gestures in the hotspot to achieve higher accuracy, including a motion history image (MHI) that is built from only assigned hot spot areas 12a, 12b.

The apparatus and methods described above can be used to control any interactive multimedia outlet device 8, such that face detection technology helps define and extract image hot spot areas 12a, 12b that limit recognition of motion to those image hot spot areas 12a, 12b, issuing command controls through human gestures to outlet device in a very robust way.

The multimedia control system 1 can be further developed to include commands that turn on the rich interaction module 7.

Figure 7:
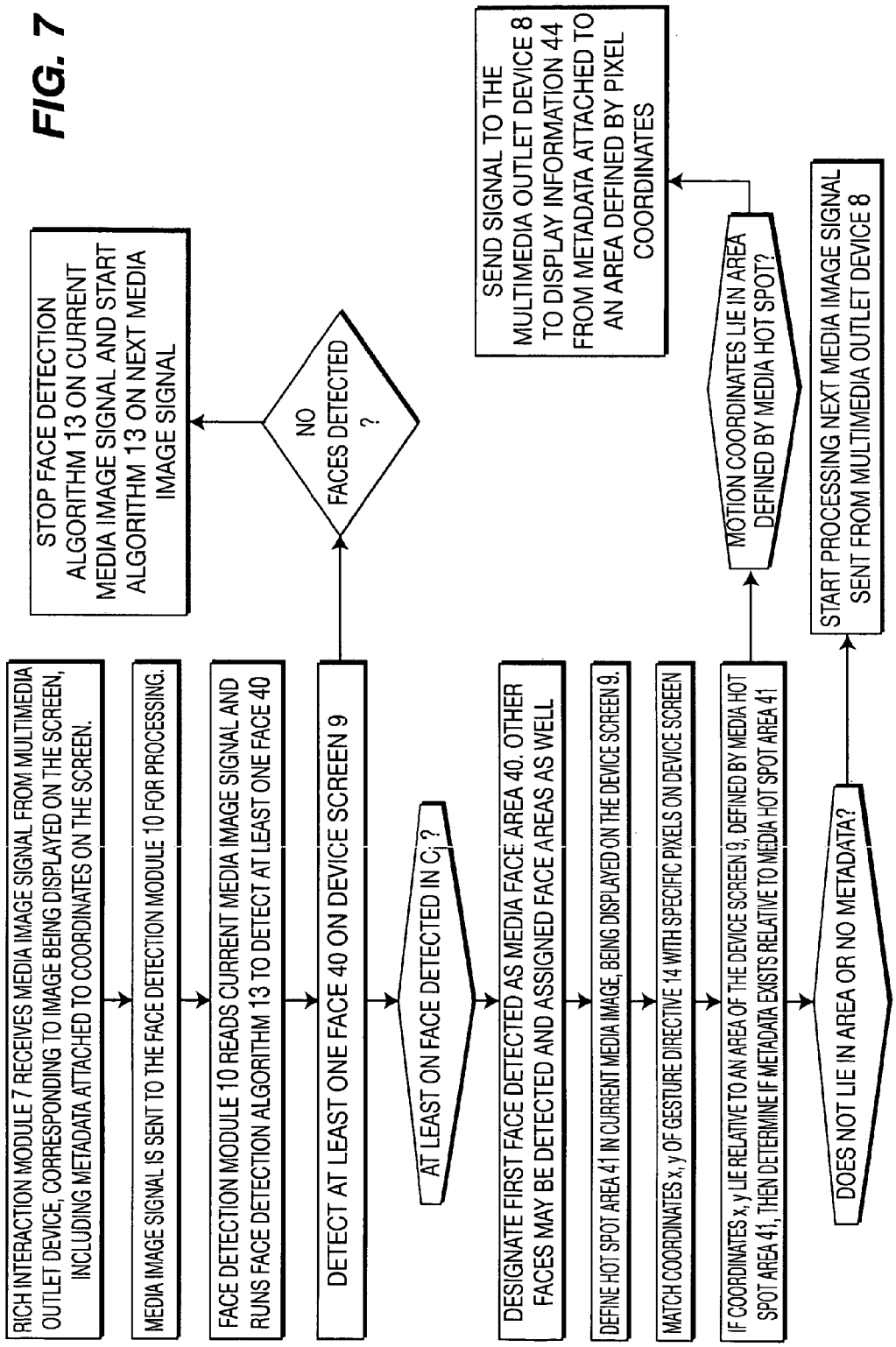
FIG. 7 is a flow diagram representing rich user interaction with multimedia imaged on a multimedia device screen using face detection.
Figure 8:
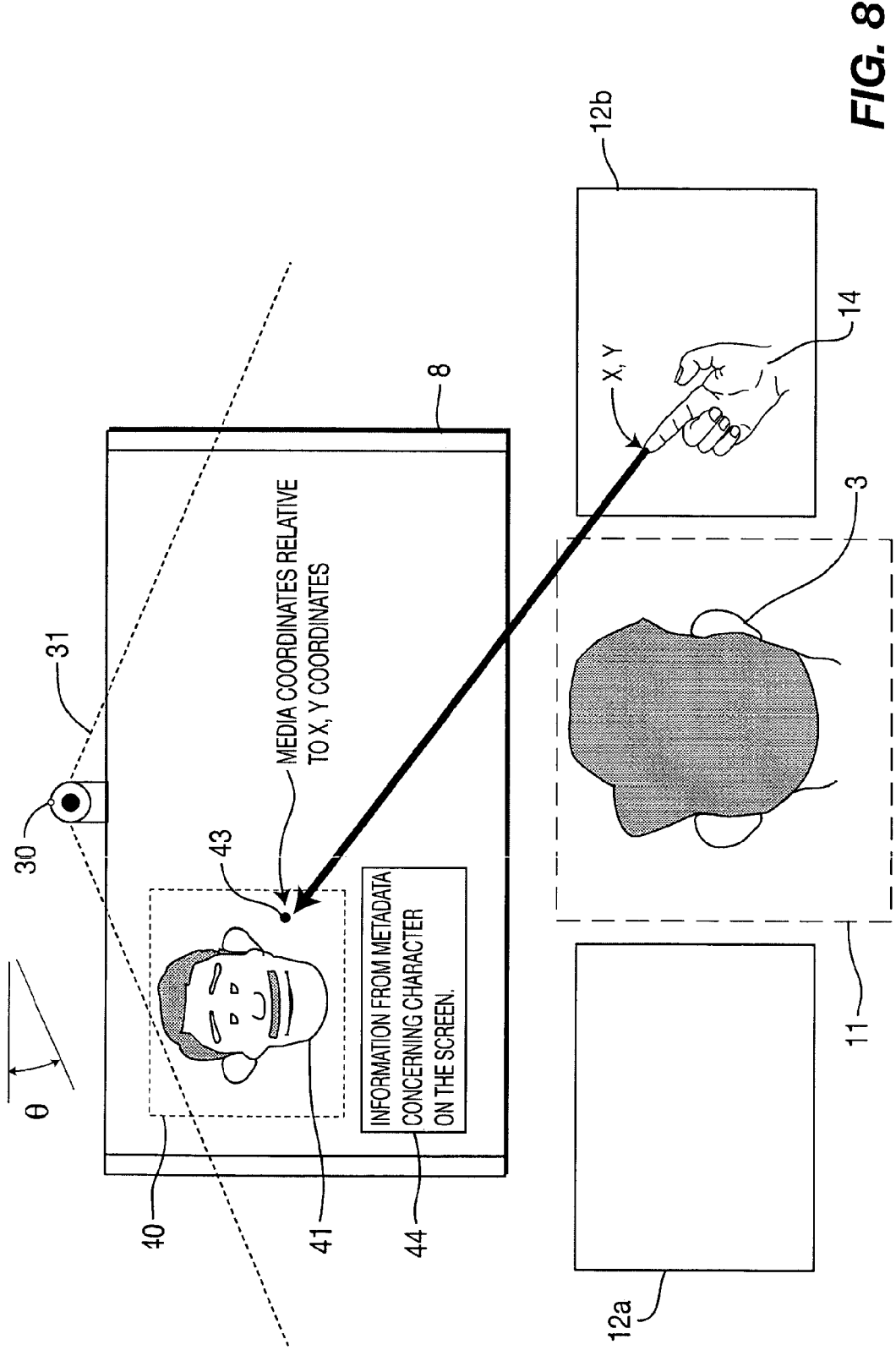
FIG. 8 is an illustrative representation of the rich interaction.
Figure 9:
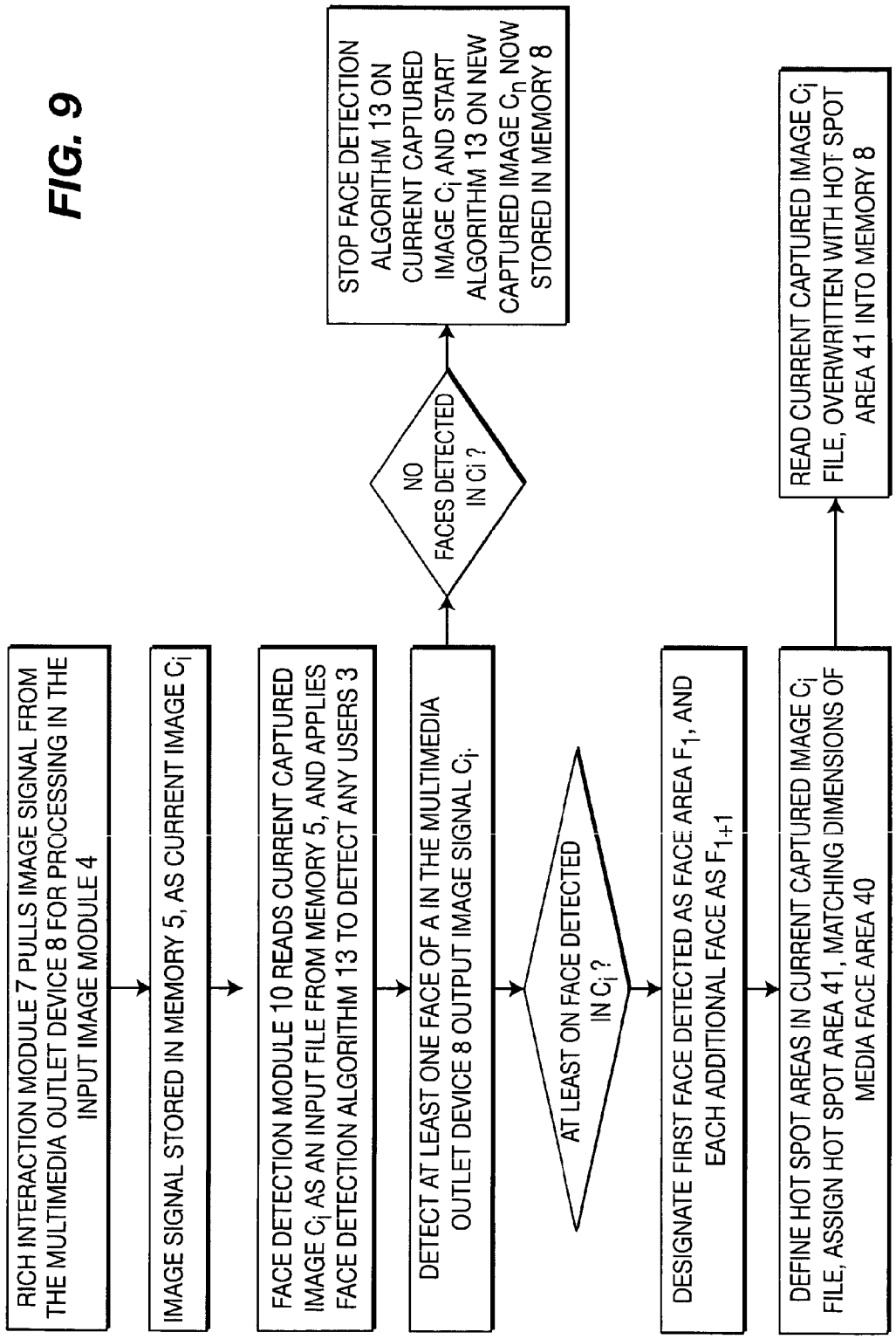
FIG. 9 is flow diagram of the face detection module, applied to an image signal sent by the multimedia device.

FIG. 7 is a flow diagram representing rich interaction with multimedia display imaged on a device screen using face detection, while FIG. 8 illustrates a visual representation of the rich interaction. FIG. 9 is flow diagram of the face detection module, applied to an image signal sent by the multimedia device.

Once turned on, the user 3 can use the rich interaction module 7, to pull image signals from the multimedia outlet device 8 for processing in the input image module 4, much like the camera images signals are processed, as described above. However, the image signals sent from the multimedia outlet device 8 including metadata, which may then displayed on the device screen 9, if requested.

The user 3 can request information about a person on the screen, using metadata integrated with the video/image signal. The user can request information by pointing to the screen, specifically at a face on the screen, which is also detected using the face detection module 10.

The input image module 4 feeds the media signals through the face detection module 10, which runs the face detection algorithm 13 to recognize faces on the device screen 9 in the same way image signals are processed, as described above. The face detection module detects a media face area 40 on the screen, and assign a single image hot spot area 41, substantially matching the dimensions of media face area 40.

Since the face detection module 10 assigns image hot spot areas 12a, 12b to the current captured image $C_i$, the rich interaction module 7 will match motion detected in the image hot spot area 12a, 12b to a specific spot on the media screen, one to one.

Fundamentally, the rich interaction module 7 determines where the gesture directive 14 appears with respect to the dimensioned image hot spot area 12a, 12b, using the gesture recognition module 20. The gesture recognition module 20 has already identified the specific image coordinates x, y, where motion exists. The meets and bounds of the movement will be relative to the dimension of the image hot spot area 12a, 12b. The rich interaction module 7 matches the image hot spot area 12a, 12b with dimensions of the device screen, proportionally matching the two. The movement captured in the image hot spot area 12a, 12b will have a defined coordinate relative to the dimensions of the image hot spot area 12a, 12b. The gesture recognition module 20 determines the image coordinates x, y relating to the movement in either image hot spot area 12a, 12b. The device screen 9 has media coordinates as well, assigned by each pixel on the device screen 9.

Since the media hot spot area 41 covers a defined area of media coordinates, the rich interaction module 7 matches the image coordinates x, y, defined by the gesture directive 14, relative to the pixels on the device screen 9. If the image coordinates x, y lie in a media coordinate area, outlined by the media hot spot area 41, then the rich interaction module 7 commands the multimedia outlet device 8 to display metadata relating to that person 40 on the screen.

Since the media signals contain metadata, the rich interaction module 7 can filter if and what information 44 is displayed on the device screen 9. Information 44 is detail in the metadata, and the metadata will be defined by an area of pixels on the screen. Since the rich interaction module 7 has determined where the gesture directive 14 is relative to a point on the device screen, the rich interaction module 7 can robustly determine what information, if any, is displayed on the device screen 9.

In an embodiment of the invention, the rich interaction module 7 will provide a command to the multimedia outlet device 8, so that a cursor 43 appears on the device screen 9.

The present invention provides an advantage by supplementing the gesture recognition with face detection technology, making the commands issued by human gestures more robust.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A method to retrieve metadata from a multimedia device comprising:
   determining a motion blob in a captured image from a multimedia device using face detection, wherein the motion blob includes at least a first area outside of a face area;
   detecting motion in at least one motion blob using gesture recognition of command gestures viewed and captured by a camera; and
   retrieving metadata assigned to pixels of the at least one motion blob,
   wherein the gesture recognition includes quantifying and qualifying motions over time in the at least one motion blob, and wherein the detecting comprises detecting the motion in the captured image.

2. The method of determining a motion blob in claim 1, further comprising taking the captured image using the camera.

3. The method of determining a motion blob in claim 1, further comprising retrieving image signals from multimedia device.

4. A media control apparatus comprising:
   a camera having an image sensor;
   an input image module that receives picture images from the image sensor;
   a memory connected to the input image module;
   a face detection module connected to the input image module, wherein the face detection module is configured to determine a motion blob including at least a first area outside of a face area;
   a gesture recognition module to capture command gestures in at least one motion blob viewed through the camera connected to the input image module;
   a media control interface that receives commands from the input image module and outputs electrical signals to a rich interaction module; and
   a rich interaction module attached to the multimedia outlet device, capable of receiving and sending electrical image signals from and to a multimedia outlet device, said rich interaction module retrieving metadata assigned to pixels of the at least one motion blob;
   wherein the gesture recognition module is adapted to quantify and qualify motions over time in the at least one motion blob, and wherein the gesture recognition module detects the motion in the current image.

5. The media control apparatus of claim 4, wherein the image sensor is integral with the camera.

6. The media control apparatus of claim 4, wherein the input image module is integral with the camera.

7. The media control apparatus of claim 4, wherein the input image module is a microprocessor.

8. The media control apparatus of claim 4, wherein the memory, the face detection module and the gesture recognition module are integral with the input image.

9. The media control apparatus of claim 4, wherein the media control interface is integral with the input image module.

10. The media control apparatus of claim 4, wherein:
    the camera, image sensor, input image module, memory, face detection module, gesture recognition module, and media control interface are integrally constructed as one component; and the media control apparatus is an external component connected to the multimedia outlet device.

11. The media control apparatus of claim 4, wherein:

the camera, image sensor, input image module, memory, face detection module, gesture recognition module, and media control interface are integrated in to one component; and the media control apparatus is an internal component of the multimedia outlet device.

12. The method according to claim 1, wherein said detecting the motion in the current captured image comprises finding, in the motion history image, largest x, y coordinates and smallest x, y coordinates that are denoted each as lx, ly, sx and sy, and then comparing each of (ly−sy) and (lx−sx) with a corresponding threshold.

13. The media control apparatus according to claim 4, wherein the gesture recognition module detects the motion in the current image by finding largest x, y and smallest x, y coordinates that are denoted each as lx, ly, sx and sy, and then comparing each of (ly−sy) and (lx−sx) with a corresponding threshold.

* * * * *